United States Patent
Cao

(10) Patent No.: US 11,485,206 B2
(45) Date of Patent: Nov. 1, 2022

(54) FASTENING SYSTEM FOR TONNEAU COVERS

(71) Applicant: Ningbo Scarman Auto Parts Co., Ltd., Cixi (CN)

(72) Inventor: Meiqin Cao, Cixi (CN)

(73) Assignee: NINGBO SCARMAN AUTO PARTS CO., LTD., Cixi (CN)

(*) Notice: Subject to any disclaimer, the term of this patent is extended or adjusted under 35 U.S.C. 154(b) by 425 days.

(21) Appl. No.: 16/719,914

(22) Filed: Dec. 18, 2019

(65) Prior Publication Data

US 2021/0170845 A1 Jun. 10, 2021

(51) Int. Cl.
*B60J 7/10* (2006.01)
*B60P 7/04* (2006.01)

(52) U.S. Cl.
CPC ............... *B60J 7/104* (2013.01); *B60P 7/04* (2013.01)

(58) Field of Classification Search
CPC ... B60J 7/102; B60J 7/104; B60J 7/141; B60J 7/185; B60J 7/04; B60P 7/04
USPC ...................... 296/100.16; 160/382
See application file for complete search history.

(56) References Cited

U.S. PATENT DOCUMENTS

| | | | | |
|---|---|---|---|---|
| 5,788,315 A * | 8/1998 | Tucker | ............... | B60J 7/102 160/395 |
| 5,934,735 A * | 8/1999 | Wheatley | ............... | B60J 7/102 296/100.18 |
| 5,984,400 A * | 11/1999 | Miller | ............... | B60J 7/104 296/100.18 |
| 6,257,647 B1 * | 7/2001 | Ninness | ............... | B60J 7/102 296/100.18 |
| 7,815,239 B1 * | 10/2010 | Schmeichel | ............... | B60J 11/00 296/136.01 |
| 2018/0111460 A1 * | 4/2018 | Xu | ............... | B60J 7/104 |

* cited by examiner

Primary Examiner — Joseph D. Pape
Assistant Examiner — Veronica M Shull
(74) Attorney, Agent, or Firm — Kilpatrick Townsend & Stockton LLP

(57) ABSTRACT

The present disclosure provides a fastening system for using in a flexible tonneau cover system. In one aspect, the fastening system comprises a corner member connected to a end rail, and a connecting member connected to an side rail. The corner member comprises a positioning tab that is received in a positioning groove formed on the connecting member. In another aspect, the fastening system comprise a corner member with a recess portion. When the corner member is connected with a side rail at an end thereof, the recess portion and the end of side rail form an accommodating groove. In another aspect, the fastening system comprise a fastening element coupled to an elongated slat. A reinforce tab is coupled with the fastening element, and wraps over an end of the elongated slat to extend at a bottom surface of the elongated slat.

19 Claims, 13 Drawing Sheets

FASTENING SYSTEM FOR TONNEAU COVERS

CROSS-REFERENCES TO RELATED APPLICATIONS

The present disclosure claims priority to Chinese Patent Application No. 201921849524.2, filed Dec. 10, 2019, entitled "A Fixed Structure of Vehicle Cover for Easy Storage", which is incorporated by reference in their entireties.

BACKGROUND OF THE INVENTION

Flexible covers are often used to cover and seal the beds of pickup trucks to protect cargo from weather, debris, and other damaging conditions. Oftentimes, the cover will be connected to a rail that is attached to the bed of the truck using a releasable fastener, such as a hook and loop fastener. The fasteners are often coupled with the rails using slats that may slide into a channel within the rails. Conventional fasteners are secured onto the slats using an adhesive or by stitching.

There are various inadequacies associated with conventional fasteners. Therefore, improved fasteners and techniques thereof are desired.

BRIEF SUMMARY OF THE INVENTION

According to an embodiment, the present disclosure provides a fastening system for use in a flexible tonneau cover system, comprising: a side rail having a latching groove at a side thereof; an end rail having a first end; a corner member having a first end and a second end, wherein the corner member is connected at the first end thereof to the first end of the end rail; a connecting member having a third end and a protrusion at a side, wherein the connecting member is connected at the third end thereof to the second end of the corner member, and the protrusion of the connecting member is received in the latching groove of the side rail; wherein the corner member comprises a positioning tab at the second end thereof, and the connecting member comprises a positioning groove at the third end thereof, and the positioning tab is received in the positioning groove.

According to another embodiment, the positioning groove comprises a top wall, a semicircular end wall disposed distant from the third end of the connecting member; a ramp bottom wall; and a side wall at the third end of the connecting member.

According to yet another embodiment, the positioning tab comprises a head portion with a half cylinder shape and a shaft portion, wherein the head portion push against the semicircular end wall of the positioning groove in the connecting member.

According to yet another embodiment, the fastening system further comprises an end member, wherein the end member is connected to a first end of the side rail.

According to yet another embodiment, the end member comprise a connecting tab received in the latching groove at the first end of the side rail.

According to yet another embodiment, the end member further comprises a reinforce tab received in an corresponding opening formed at the first end of the side rail.

According to yet another embodiment, the fastening system further comprises a fastener inserted into a hole formed on the connecting member to fasten the connecting member into the latching groove in the side rail.

According to yet another embodiment, the corner member comprises a connecting tab received in an opening in the end rail.

According to yet another embodiment, corner member comprises a fastener inserted into a hole formed on the connecting tab of the corner member to fasten the corner member into the opening on the end rail.

According to yet another embodiment, the corner member comprises a reinforce tab at the first end thereof, wherein the reinforce tab is received in an corresponding receiving opening formed at the first end of the end rail.

According to yet another embodiment, the fastening system further comprises a locking mechanism releasably locking the corner member and the side rail, wherein the locking mechanism comprises a locking member passing through a hole formed at the second end of the corner member; an elastic member sleeved on the locking member; a stop member coupled with the locking member to stop movement of the locking member in a direction; and an actuator coupled with the locking member to release a locking relationship between the corner member and the side rail.

According to an embodiment, the present disclosure provides a fastening system for use in a flexible tonneau cover system, comprising: a side rail; a corner member connected at a first end thereof to a second end of the side rail, wherein the corner member comprises a connecting tab on the first end thereof, and the side rail comprises an opening in the second end thereof, wherein the connecting tab is inserted in the opening to make the first end of the corner member positioned to adjoin the second end of the side rail, a substantially flat elongated slat having a first end along a longitudinal direction, wherein the elongated slat being inserted in a channel formed on a top portion of the side rail; a fastening element coupled with a top surface of the elongated slat, the fastening element being disengageably coupled to the flexible tonneau cover system; wherein the corner member further comprises a recess portion adjoining the first end thereof, wherein an accommodating groove is formed when the first end of the corner member adjoins the second end of the side rail.

According to yet another embodiment, the accommodating groove has a width of at least twice of a thickness of the flexible cover.

According to yet another embodiment, the accommodating groove has a depth that do not totally expose the elongated slat from the second end of the side rail when the elongated slat is inserted in the channel of the side rail.

According to an embodiment, the present disclosure provides a fastening system for use in a flexible tonneau cover system, comprising: a side rail; a substantially flat elongated slat having a first end along a longitudinal direction, wherein the elongated slat being inserted in a channel formed on a top portion of the side rail; a fastening element coupled with a top surface of the elongated slat, the fastening element being disengageably coupled to the flexible tonneau cover system; a reinforce tab coupled with the fastening element, wherein the reinforce tab wraps over the first end of the elongate slat and extends along a bottom surface of the elongated slat.

According to yet another embodiment, the fastening element is coupled with the top surface of the elongated slat through stitches extending along at least part of a length of the fastening element.

According to yet another embodiment, the channel of the side rail comprises a retaining member for retaining the elongated slat, wherein the retaining member covers at least a part of the stitches.

According to yet another embodiment, the fastening system further comprises a sleeve wrapped over the elongated slat around a longitudinal axis of the elongated slat, wherein the fastening element is coupled with the sleeve.

According to yet another embodiment, the reinforce tab is coupled with the sleeve.

According to yet another embodiment, the fastening element comprises hook and loop fastener.

It is to be appreciated that embodiments of the present disclosure provides many advantages over conventional techniques. Among other things, the retaining member in the fastening system can protect the stitches from negative interference brought about by weather, temperature fluctuation, humidity, debris and dirt, etc. The accommodating groove may provide some room for the sagged flexible cover to prevent the flexible cover from being broken or worn out by compressing force imposed thereon by the mating of the first end of the corner member and the second end of the side rail.

The present disclosure achieves these benefits and others in the context of known technology. However, a further understanding of the nature and advantages of the present disclosure may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1A:
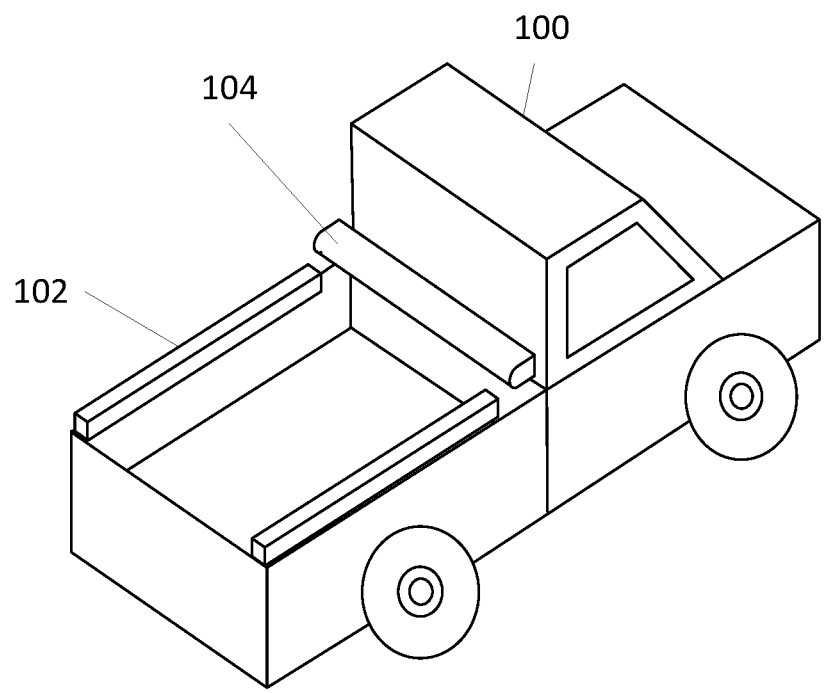
FIGS. 1A-1B show an embodiment of a pickup truck having a flexible tonneau cover.

As mentioned above, conventional fastening systems are inadequate. For example, the release force from the separation of the fastener on the rail and the fastener on the cover may exceed the holding force of adhesives used to secured the fastener to the slat, leading to the peeling and ultimate separation of the fastener from the slat. In systems using stitched on fasteners, the stitching reduces the area on which force is applied on the fastener. This reduction in area results in increased force on the area near the stitching, leading to the fastener be damaged and/or separated from the rail.

In conventional fastening system, the flexible cover in its stowed configuration may sag and cover the top part of the corner member. When installing the side rail with the corner member, the side rail may adjoin against the corner member and impose compressing force on the sagged flexible cover. It may cause the flexible cover to be broken or worn out prematurely at the sagged portion.

The following description is presented to enable one of ordinary skill in the art to make and use the disclosure and to incorporate it in the context of particular applications. Various modifications, as well as a variety of uses in different applications will be readily apparent to those skilled in the art, and the general principles defined herein may be applied to a wide range of embodiments. Thus, the present disclosure is not intended to be limited to the embodiments presented, but is to be accorded the widest scope consistent with the principles and novel features disclosed herein.

In the following detailed description, numerous specific details are set forth in order to provide a more thorough understanding of the present disclosure. However, it will be apparent to one skilled in the art that the present disclosure may be practiced without necessarily being limited to these specific details. In other instances, well-known structures and devices are shown in block diagram form, rather than in detail, in order to avoid obscuring the present disclosure.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1B:
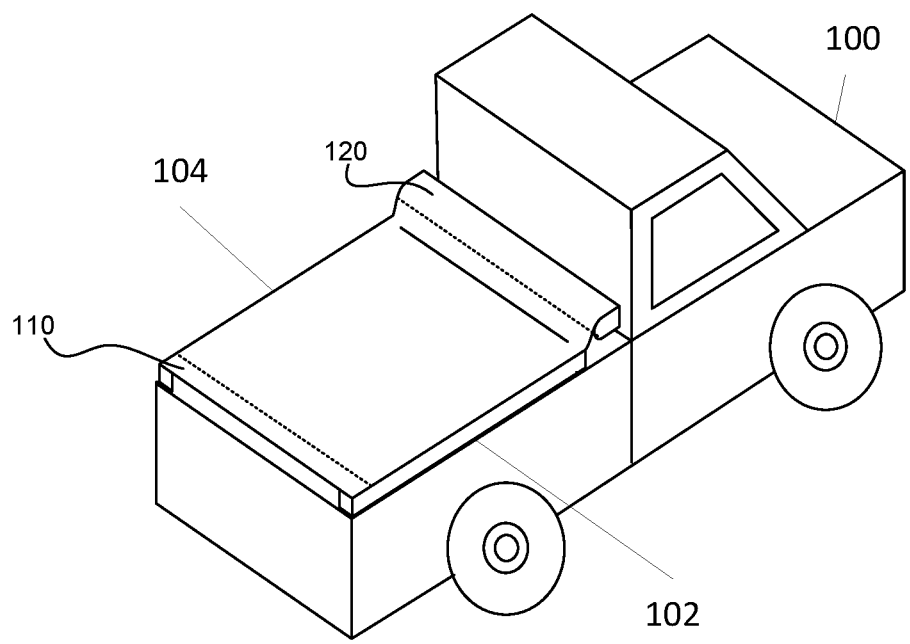

Referring now to FIGS. 1A and 1B, an embodiment of a pickup truck 100 having a flexible tonneau cover is shown. Truck 100 may include a set of side rails 102 that may be coupled with a top edge of side walls of a bed of the truck 100. The truck 100 may also include a flexible cover 104. In some embodiments, flexible cover 104 may be coupled with a back of a cab of truck 100 or with a front of the bed of truck 100. As seen in FIG. 1A, the flexible cover 104 may be in a first, stowed configuration. In the stowed configuration, the flexible cover 104 may be rolled or otherwise folded and stored at a front of the bed of truck 100. As seen in FIG. 1B, the flexible cover 104 may also be in a second, extended configuration. In the extended configuration, the flexible cover 104 may be drawn over all or part of the bed of the truck 100, such that all or a portion of the bed of truck 100 is sealed from the elements. The flexible cover 104 may be coupled with side rails 102 using one or more fasteners positioned along a length of the flexible cover 104 and/or the side rails 102.

Figure 2:
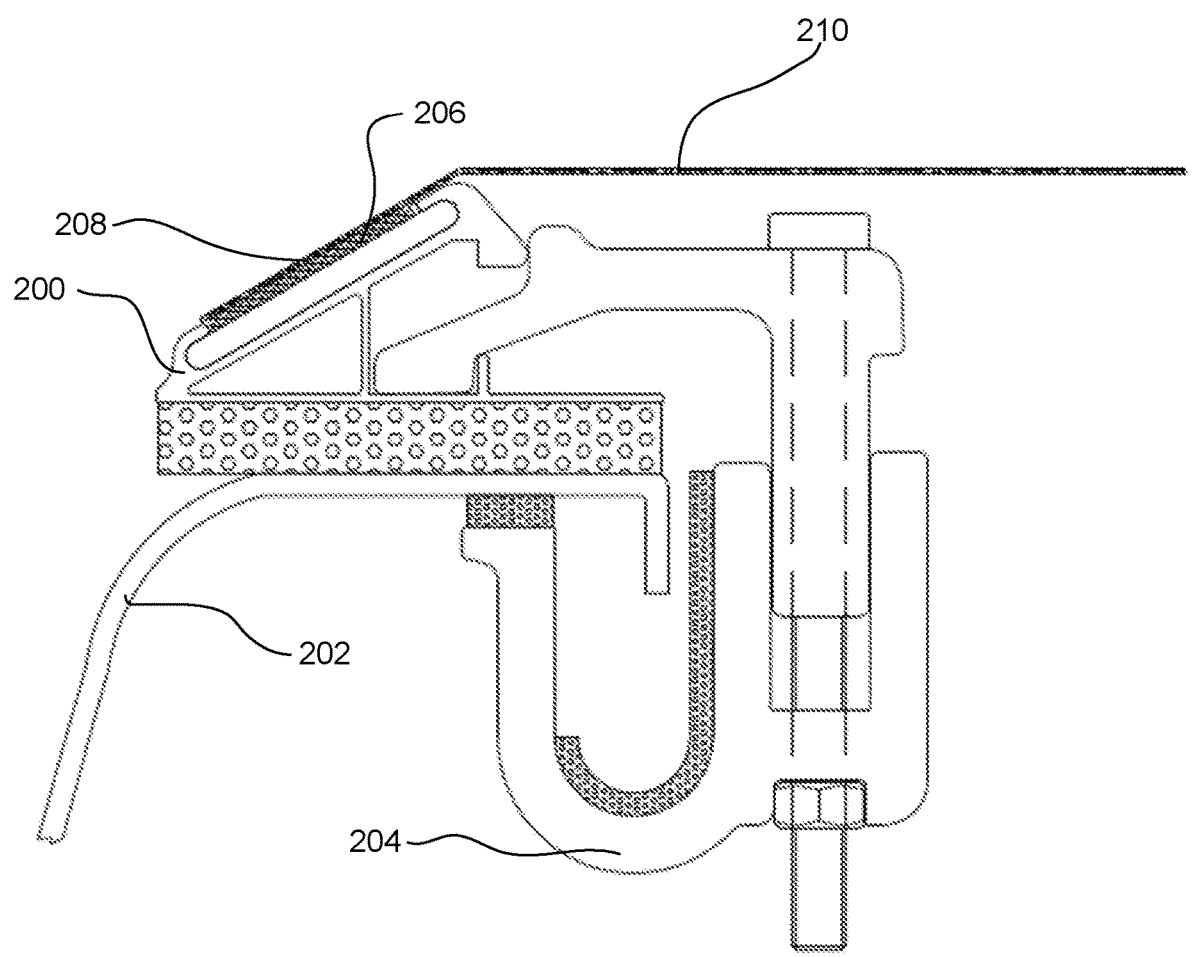
FIG. 2 shows an embodiment of a side rail attached to an upper edge of a side wall of the bed of the pickup truck.

FIG. 2 shows an embodiment of a side rail 200 attached to an upper edge 202 of a side wall of the bed of the pickup truck. The side rail 200 may be permanently mounted on the upper edge 202, removeably secured using a fastener, and/or may be mounted using a clamp 204. The clamp 204 may attach to a portion of the upper edge 202, such as an inner surface, as well as an inner surface of side rail 200. The side rail 200 may be configured to receive and secure a fastening slat having a fastening element 206. The fastening element 206 may be any fastener, such as a hook and loop fastener or a snap. The fastening element 206 may be configured to mate with a corresponding fastening element 208 that is positioned on a flexible cover 210. By coupling the two fastening elements 206, 208 together, the flexible cover 210 may remain in an extended configuration to cover and seal a bed of the pickup truck.

Figure 3:
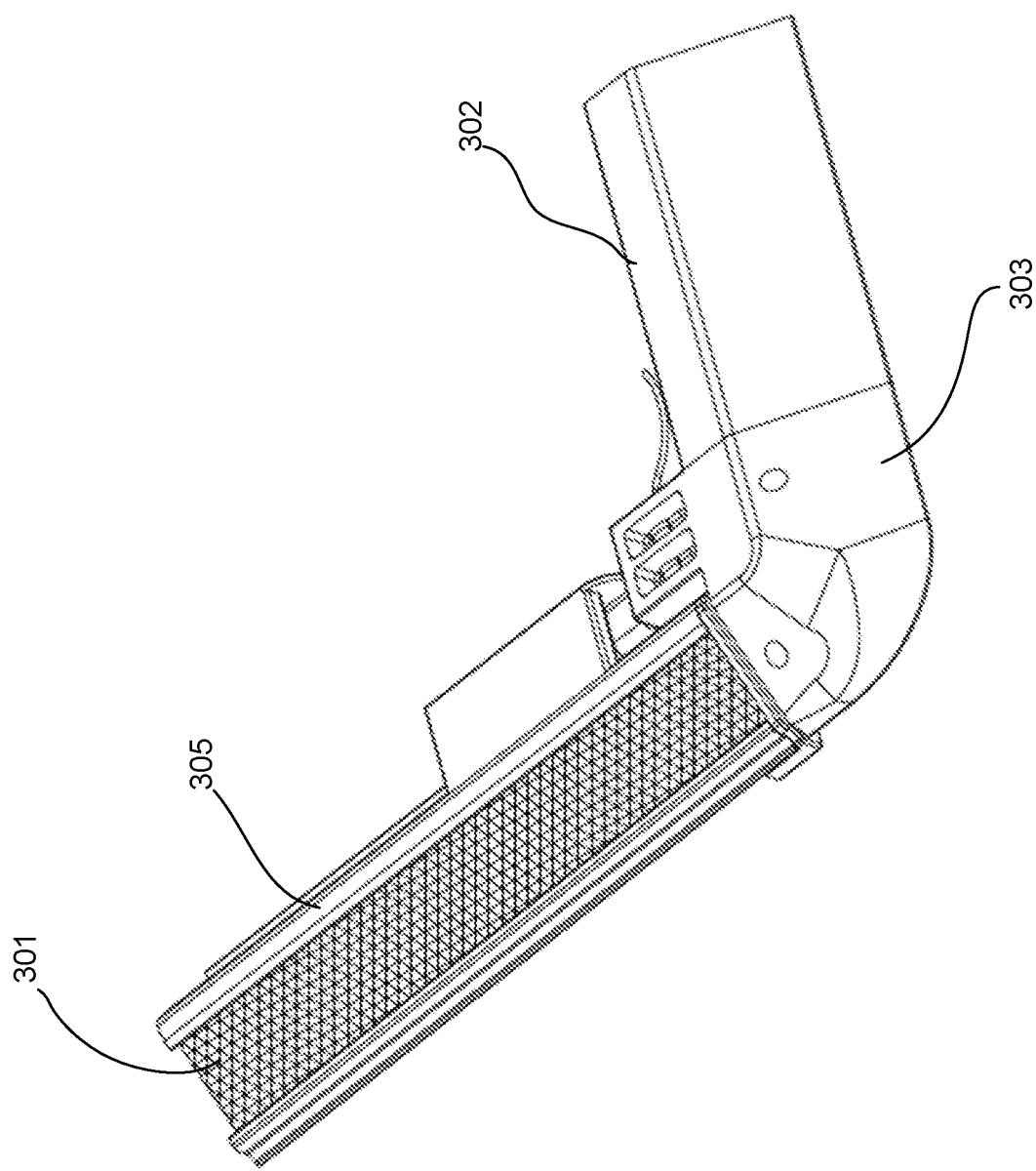
FIG. 3 is a simplified diagram illustrating a part of the fastening system according to some embodiments of the present disclosure.

FIG. 3 is a simplified diagram illustrating a part of the fastening system according to some embodiments of the present disclosure. This diagram is merely an example, which should not unduly limit the scope of the claims. One of ordinary skill in the art would recognize many variations, alternatives, and modifications. In some embodiment, the fastening system comprise a fastening element 301 which provides an interface for coupling to the flexible cover (not shown). The fastening element 301 is coupled with a substantially flat elongated slat (not shown), which will be described in detail below. For example, the fastening element 301 includes hook and/or loop fasteners, which are to be operably coupled with hook and/or loop fasteners on the flexible cover. In some embodiments, the fastening system may comprise an end rail 302 that is coupled with a side rail 305 via a corner member 303. For example, both end rail 302 and the corner member 303 are substantially immoveable once installed onto a truck bed. In various embodiments, the end rail 302 and the corner member 303 are both positioned at region 120 in FIG. 1A.

Figure 4A:
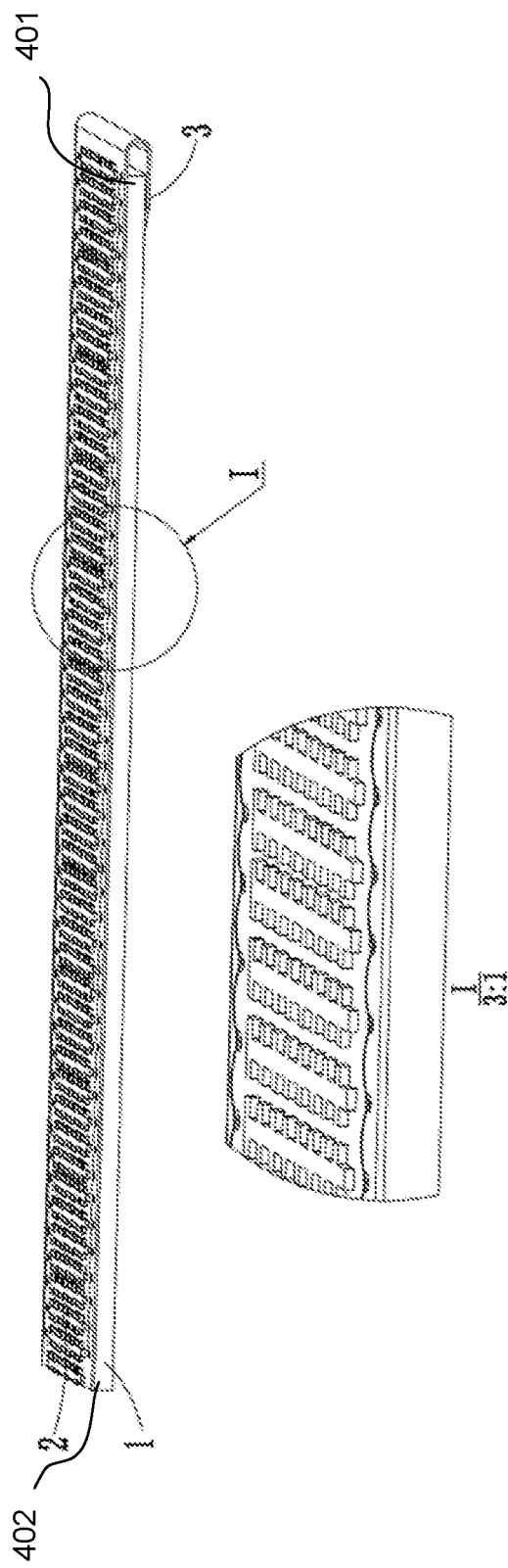
FIG. 4A-4B are simplified diagrams illustrating part of the fastening system according to some embodiments of the present disclosure.
Figure 4B:

FIG. 4A-4B are simplified diagrams illustrating part of the fastening system according to some embodiments of the present disclosure. This diagram is merely an example, which should not unduly limit the scope of the claims. One of ordinary skill in the art would recognize many variations, alternatives, and modifications. In some embodiments, the fasten system comprises a substantially flat elongated slat 1 which is inserted in the channel 306 (shown in FIG. 5A) formed on the top portion of the side rail 305 (shown in FIG. 3). A fastening element 2 is coupled with a top surface of the elongated slat 3. In this way, the fastening element 2 is coupleable to the flexible cover 210 (as shown in FIG. 2) that is extendable over the bed of the pickup truck. The fastening system comprises a reinforce tab 3 that is coupled with the fastening element 2. In some embodiments, the reinforce tab 3 can be integrated with the fastening element 2. As shown in circle I of FIG. 4A, the fastening element 2 can be coupled with the top surface of the elongated slat 1 through two stitches extending along at least part of a length of the fastening element, each of which extending at one side of the fastening element 2. As shown in FIGS. 4A and 4B, the reinforce tab 3 wrap over a first end 401 of the elongated slat 1 and extends along a bottom surface of the elongated slat 1 for a certain length. In some embodiments, at least a portion of the reinforce tab 3 that extend along the bottom surface of the elongated slat 1 is attached to the bottom surface, for example by adhesive or stitches. In some other embodiments not shown, another reinforce tab can also wrap over the second end 402 of the elongated slat 1 and extends along the bottom surface of the elongated slat 1 for a certain length. In some other embodiments not shown, the fastening system can comprise a sleeve wrapped over the elongated slat 1 around a longitudinal axis thereof, and the fastening element 2 is coupled with the sleeve. In some other embodiment not shown, the reinforce tab 3 is coupled with the sleeve, or the reinforce tab 3 can be integrated with the sleeve.

Figure 5A:
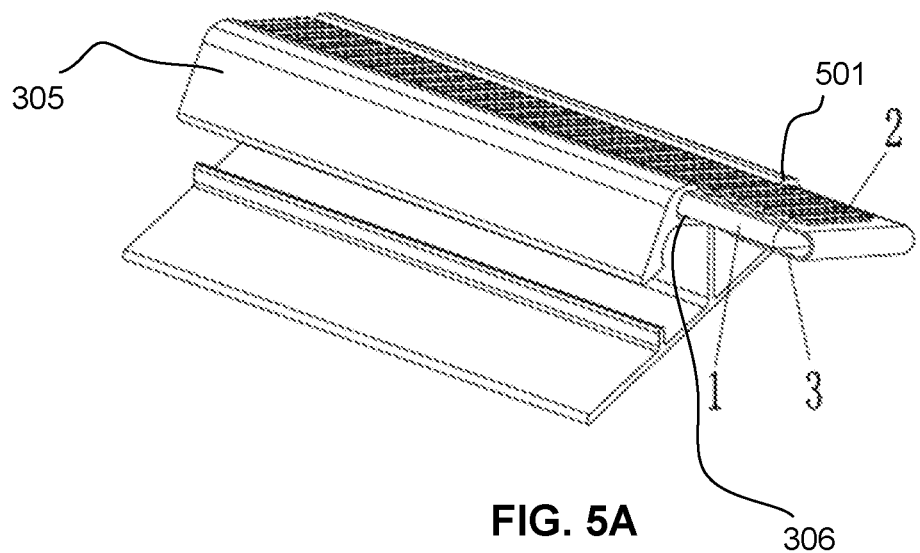
FIG. 5A-5C are simplified diagrams illustrating a part of the fastening system according to some embodiments of the present disclosure.
Figure 5B:
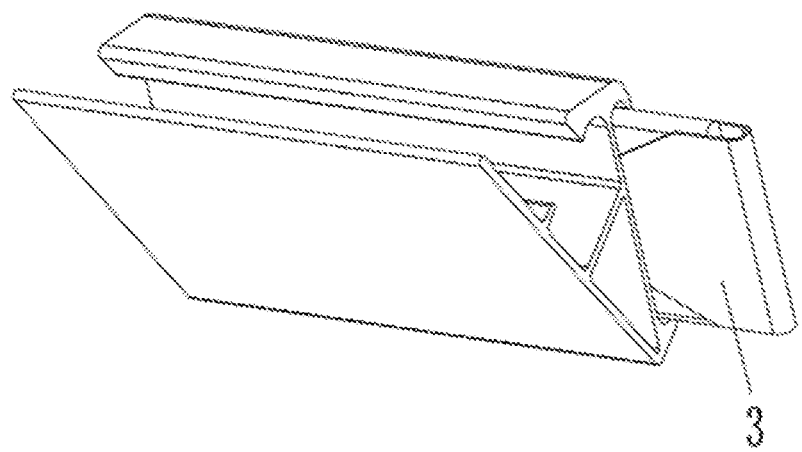
Figure 5C:
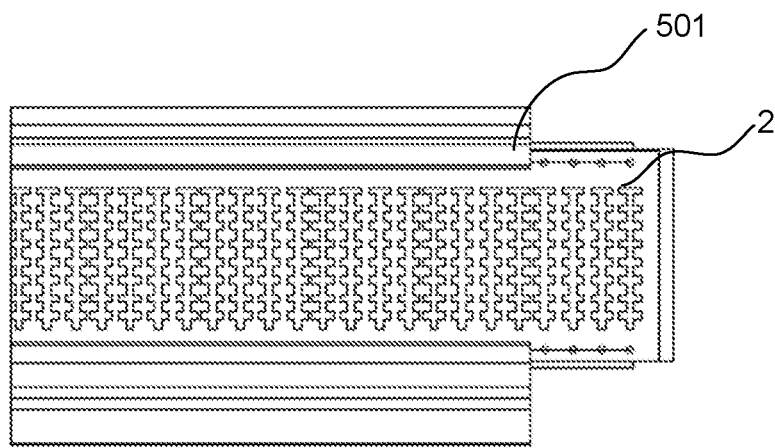

FIG. 5A-5C are simplified diagrams illustrating a part of the fastening system according to some embodiments of the present disclosure. These diagrams are merely an example, which should not unduly limit the scope of the claims. One of ordinary skill in the art would recognize many variations, alternatives, and modifications. As shown in FIG. 5A, the elongated slat 1 together with the fastening element 2 coupled on the top surface thereof is inserted in the channel 306 of the side rail 305. In some embodiments, the side rail 305 can comprise retaining members 501, each of which is disposed at the two sides of the channel 306. The retaining member 501 can retain the assembly comprised of the elongated slat 1, the fastening element 2 and the reinforce tab 3. As shown in FIG. 5B, the reinforce tab 3 is adjoin against the bottom surface of the channel 306 (shown in FIG. 5A) when the assembly comprised of the elongated slat 1, the fastening element 2 and the reinforce tab 3 is inserted in the channel 306. Usually, the first end 401 (shown in FIG. 4A) is disposed at a rear end 110 as shown in FIG. 1B, where the flexible cover is opened/closed. When the flexible cover 104 (shown in FIG. 1B) is attached/detached from the fastening element 2, the physical force imposed on the first end 401 (shown in FIG. 4A) is the largest. The reinforce tab 3 can help to preserve the fastening element 2 and/or the elongated slat 1 from being worn out prematurely or torn up. In some embodiments as shown in FIG. 5C, the retaining member 501 covers the stitches on the fastening element 2 when the assembly comprised of the elongated slat 1, the fastening element 2 and the reinforce tab 3 is inserted in the channel 306 (shown in FIG. 5A). In this case, the retaining member 501 can protect the stitches from negative interference brought about by weather, temperature fluctuation, humidity, debris and dirt, etc.

Figure 6A:
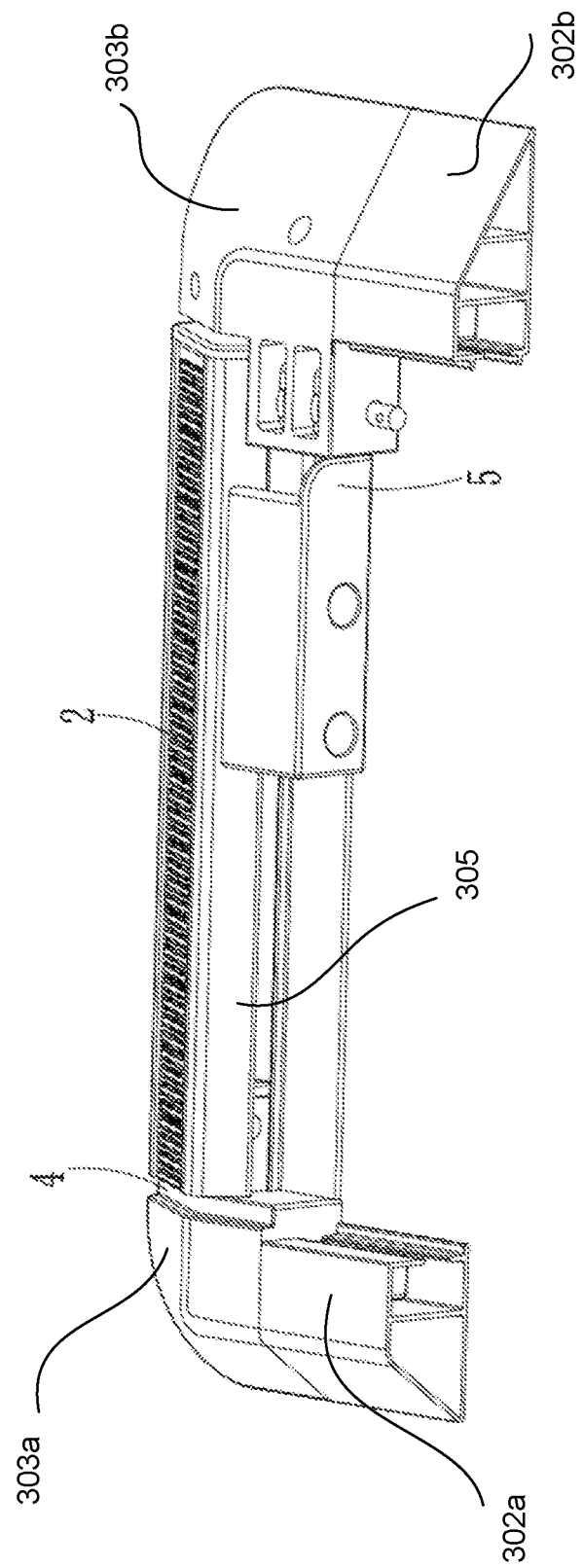
FIGS. 6A-6D are simplified diagram illustrating a part of the fastening system according to some embodiments of the present disclosure.
Figure 6B:
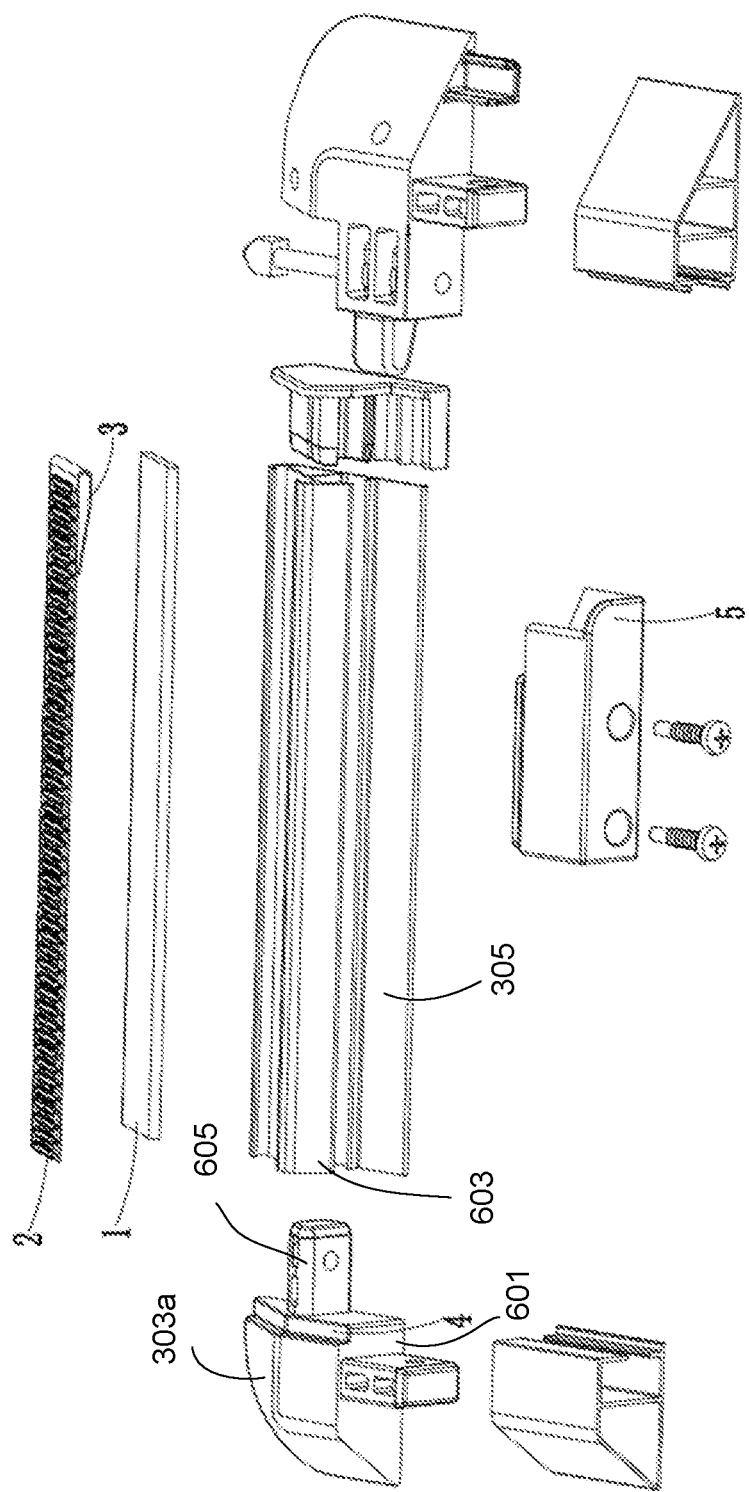
Figure 6C:
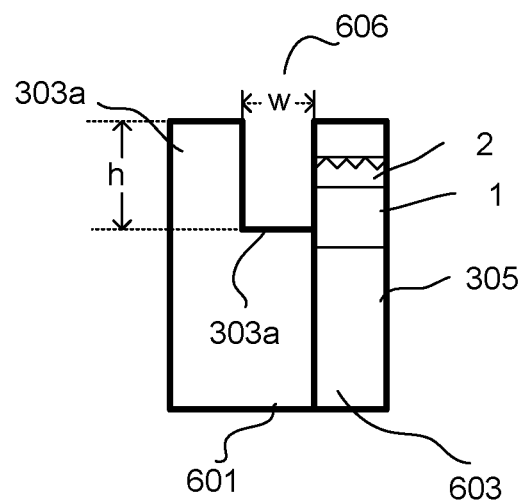
Figure 6D:
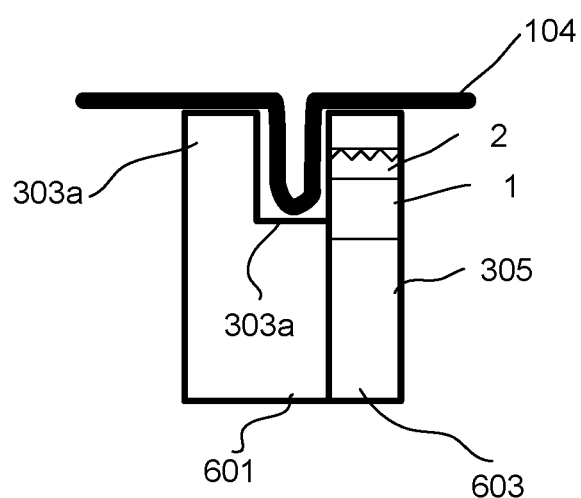

FIGS. 6A-6C are simplified diagram illustrating a part of the fastening system according to some embodiments of the present disclosure. These diagrams are merely an example, which should not unduly limit the scope of the claims. One of ordinary skill in the art would recognize many variations, alternatives, and modifications. As shown in FIG. 6A, the side rail 305 is connected to end rails 302a and 302b through corner members 303a and 303b. Generally, the corner member 303a and end rail 302a are positioned in the region 120 (shown in FIG. 1B), where the flexible cover 104 is in the stowed configuration. As shown in FIG. 6B, the corner member 303a is connected at a first end 601 thereof to a second end 603 of the side rail 305. The corner member 303a comprises a connecting tab 605 on the first end 601, and the side rail 305 comprises an opening (not shown) in the second end 603 thereof. The connecting tab 605 of the corner member 303a is inserted in the opening (not shown) to make the first end 601 of the corner member 303a positioned to adjoin the second end 603 of the side rail 305. As shown in FIG. 6b, the corner member 303a further comprises a recess portion 4 adjoining the first end 601. As shown in FIG. 6C, the recess portion 4 is configured to form an accommodating groove 606 between the first end 601 of the corner member 303a and the second end 603 of the side rail 305 when the corner member 303a adjoins the side rail 305. The width w of the groove 606 is preferably configured to be at least twice of a thickness of the flexible cover, and the depth h of the groove 606 is preferably configured to not totally expose the elongated slat 1 from the second end 603 of the side rail 305 when the elongate slat 1 is inserted in the channel 306 (not shown) of the side rail 305. Usually, the flexible cover 104 in its stowed configuration in region 120 (shown in FIG. 1) may sag and cover the top part of the first end 601 as shown in FIG. 6D. When installing the side rail 305, the second end 603 of the side rail 305 will adjoin the first end 601 of the corner member 303a, the accommodating groove 606 may provide some room for the sagged flexible cover 104 to prevent the flexible cover 104 from being broken or worn out by compressing force imposed thereon by the mating of the first end 601 of the corner member 303a and the second end 603 of the side rail 305. The depth h of the groove 606 can also help to stop the assembly comprised of the elongated slat 1 and the fastening element 2 from getting out of the channel 306 (not shown).

Figure 7A:
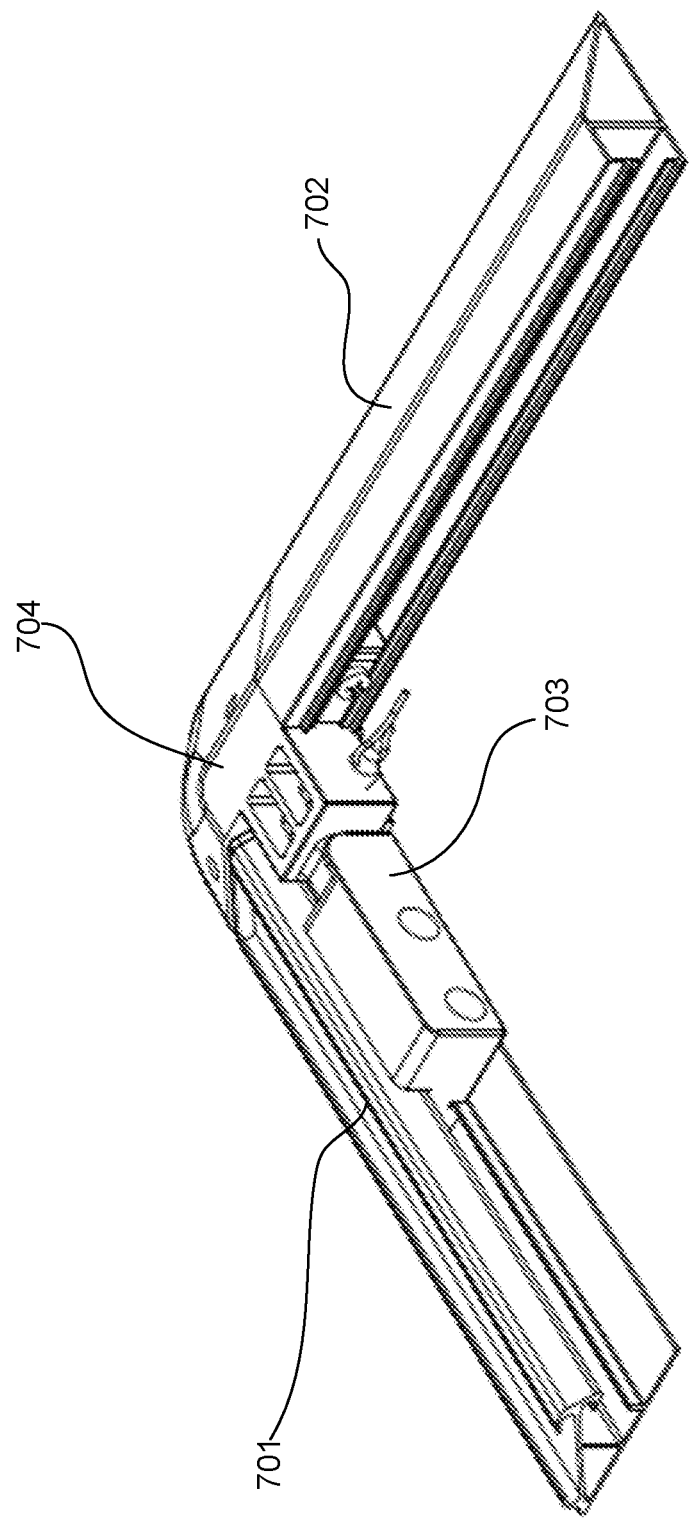
FIGS. 7A-7G are simplified diagrams illustrating a part of the fastening system according to some embodiments of the present disclosure.
Figure 7B:
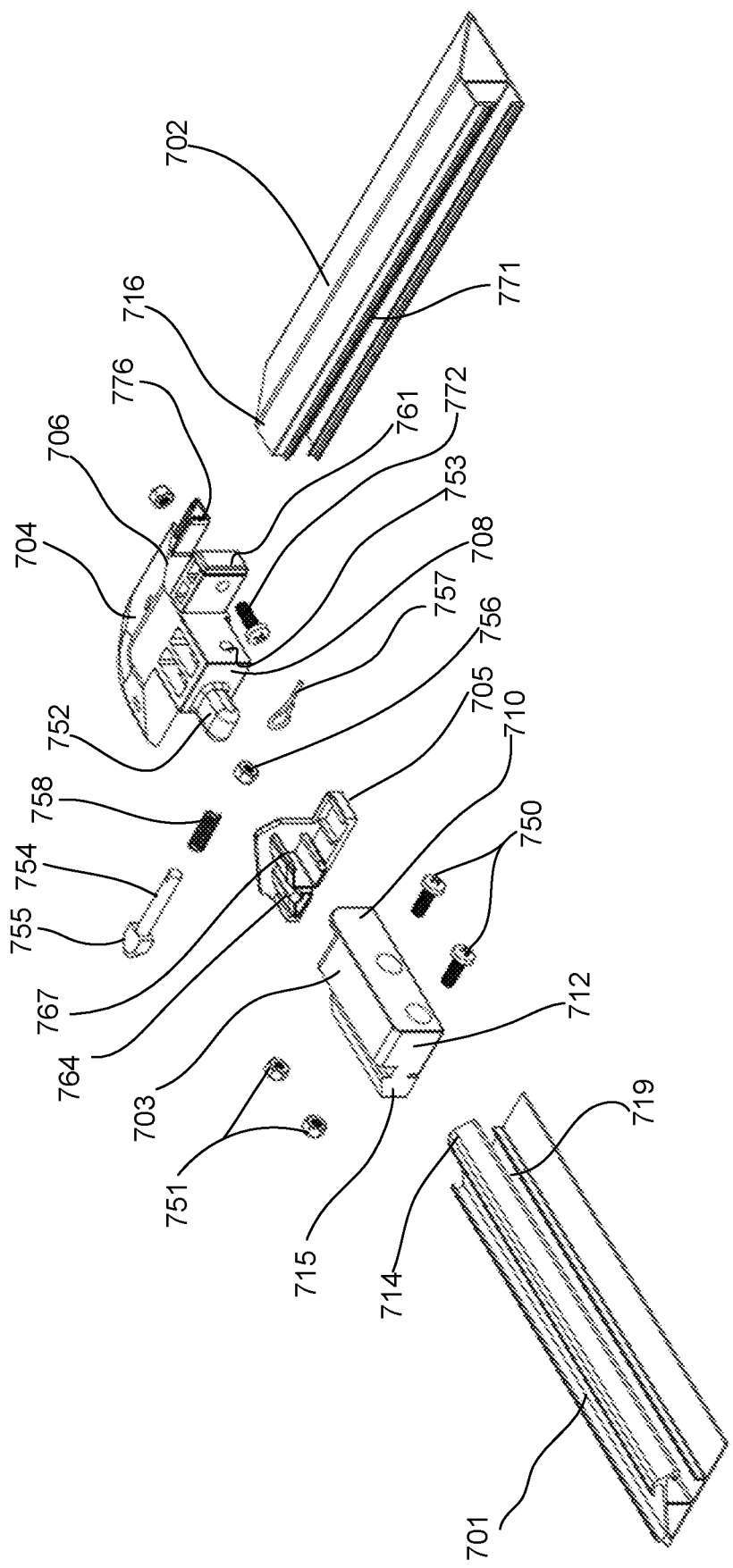

FIGS. 7A-7G are simplified diagrams illustrating a part of the fastening system according to some embodiments of the present disclosure. These diagrams are merely an example, which should not unduly limit the scope of the claims. One of ordinary skill in the art would recognize many variations, alternatives, and modifications. FIG. 7A shows a part of the fastening system being in assembly state. The fastening system comprises a side rail 701, an end rail 702, a connecting member 703, a corner member 704 and an end member 705 (shown in FIG. 7B). FIG. 7B shows the part of the fastening system as shown in FIG. 7A in exploded view. The side rail 701 has a latching groove 719 at a side. The corner member 704 comprises a first end 706 and a second end 708. The first end 706 and the second 708 are substantially perpendicular to each other since the corner member 704 provide a connection with the side rail 701 and end rail 702 which are perpendicular to each other. The corner member 704 is connected at the first end 706 thereof to a first end 716 of the end rail 702. The connecting member 703 comprises a third end 710 and a fourth end 712. The connecting member 703 is connected at the third end 710 to the second end 708 of the corner member 704. The connecting member 703 has a protrusion 715 at a side. The protrusion 715 has a shape that is conformed with the shape of latching groove 719 on the side rail 701. The connecting member 703 is connected to the side rail 701 by mating the protrusion 715 with the latching groove 719. The corner member 704 comprises a positioning tab 752 at the second end 708 thereof, and the connecting member 703 comprises a positioning groove (not shown) at the third end 710 thereof, detail of which will be described below. The positioning tab 752 is received in the positioning groove, which will be described in detail below.

As shown in FIG. 7B, the fastening system comprise a locking mechanism releasably locking the corner member 704 and the side rail 701. The locking mechanism may comprise a locking member 754 passing through a hole 753 formed at the second end 708 of the corner member 704; an elastic member 758 sleeved on the locking member 754; a stop member 756 coupled with the locking member 754 to stop movement of the locking member 754 in a direction; and an actuator 757 coupled with the locking member 754 to release the locking relationship between the corner member 704 and the side rail 701. A head portion 755 of the locking member 754 can be inserted in the latching groove 719 to lock the corner member 704 and the side rail 701. As shown in FIG. 7F, when the corner member 704 is needed to detach from the side rail 701 to achieve the detachment of the end rail 702 from the side rail 701, the actuator 757 can be actuated and the head portion 755 of the locking member 754 will detach from the latching groove (not shown) on the side rail 701. In some embodiments, the elastic member 758 may be a wire spring. In some embodiments, the stop member 756 may be a nut that attached to the thread formed on the locking member 754. In some embodiments, the actuator 757 may pass through a hole formed on the locking member 754.

As shown in FIG. 7B, the end member 705 is connected to the first end 714 of the side rail 701. The end member 705 comprises a connecting tab 767, which is received in the latching groove 719 at the first end 714 of side rail 701. The end member 705 may also comprise a reinforce tab 764 which is received in an corresponding opening (not shown) formed at the first end 714 of the side rail 701. A fastener 750 may be inserted into a hole formed on the connecting member 703 to fasten the connecting member 703 into the latching groove 719 in the side rail 701. In some embodiments, there are two fasteners 750 and corresponding holes. In some embodiments, a corresponding nut 751 may be cooperate with the fastener 750 to achieve the fastening result.

As shown in FIG. 7B, the corner member 704 comprises a connecting tab 761, which is received in an opening 771 in the end rail 702. A fastener 772 may be inserted into a hole formed on the connecting tab 761 to fasten the corner member 704 into the opening 771 on the end rail 702. The corner member 704 may also comprise a reinforce tab 776 at the first end 706 thereof, which is received in an corresponding receiving opening (not shown) formed at a first end 716 of the end rail 702.

Figure 7C:
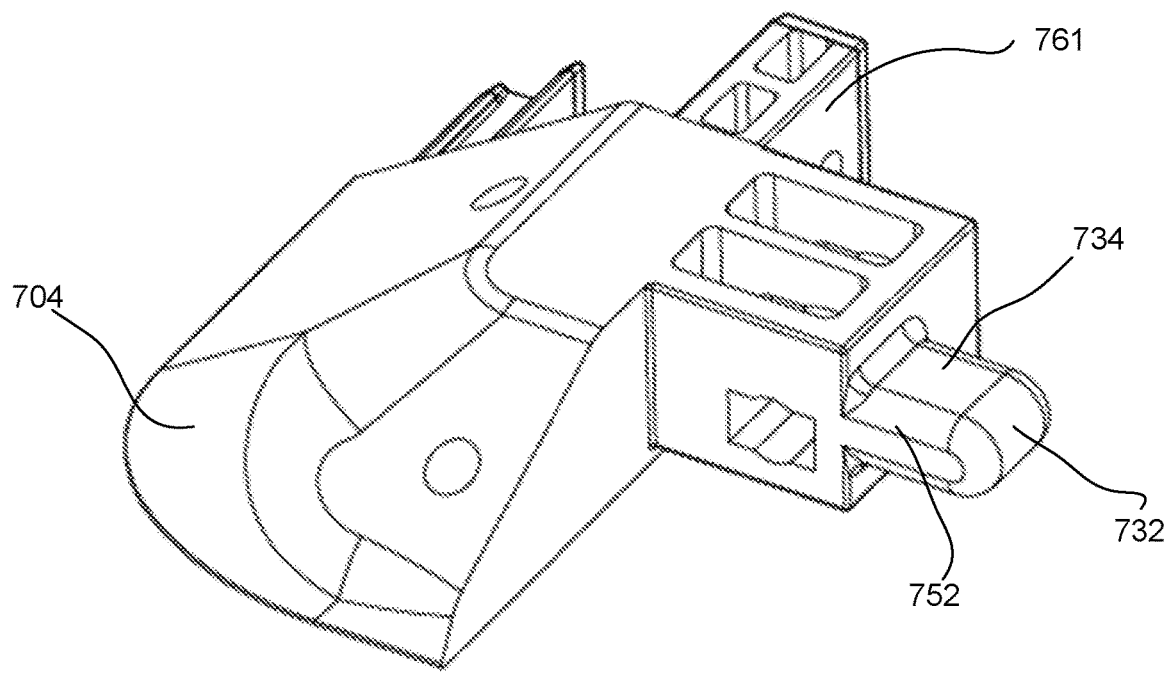
Figure 7D:
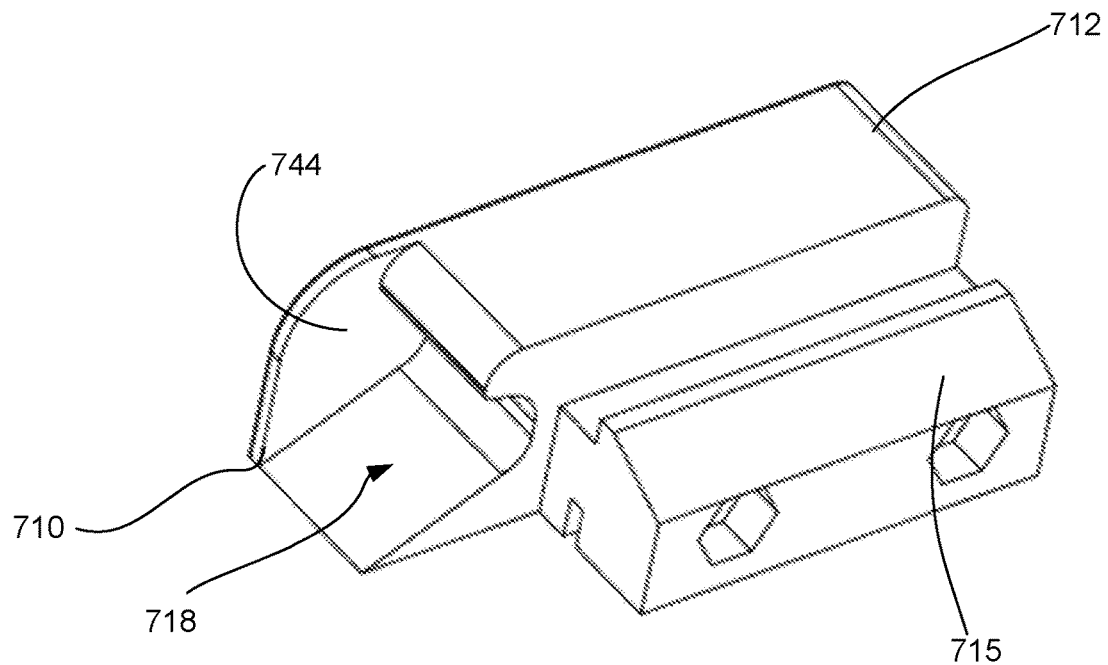
Figure 7E:
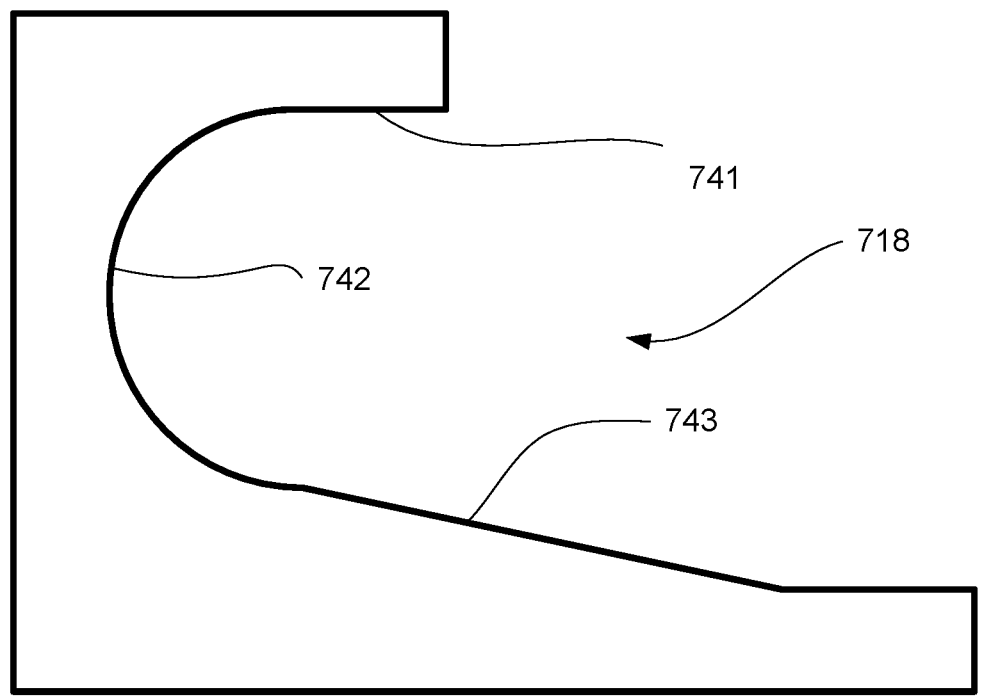
Figure 7F:
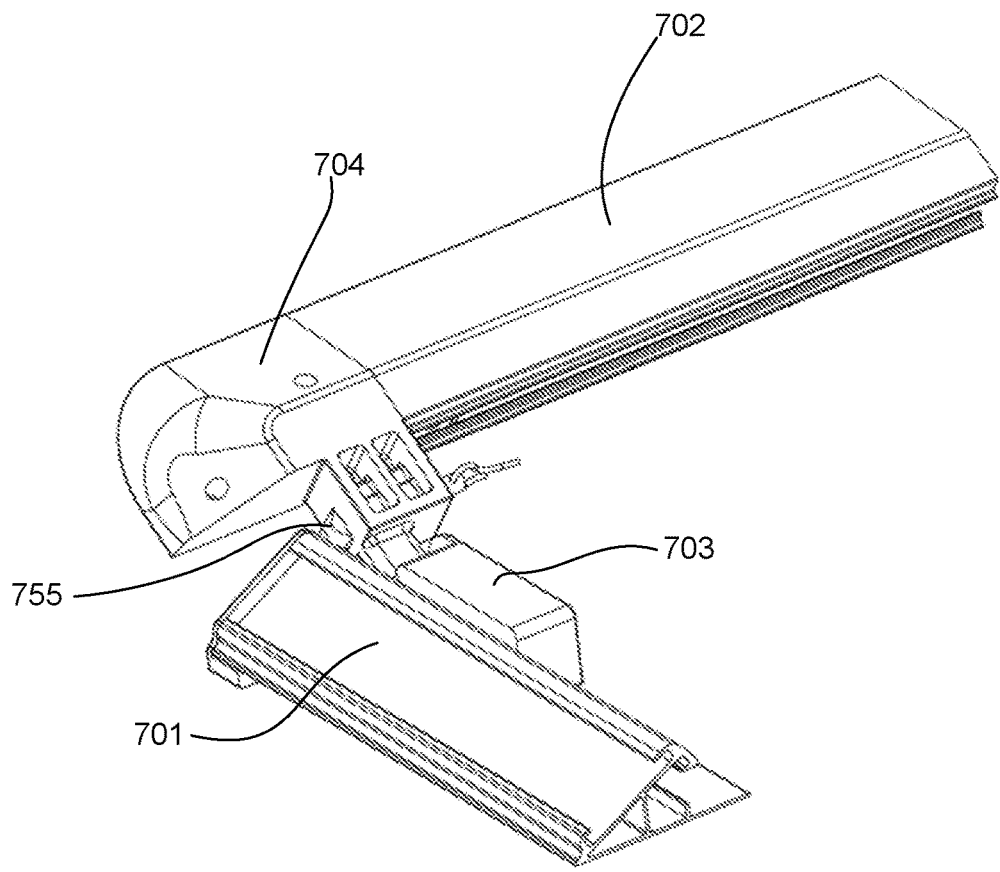
Figure 7G:
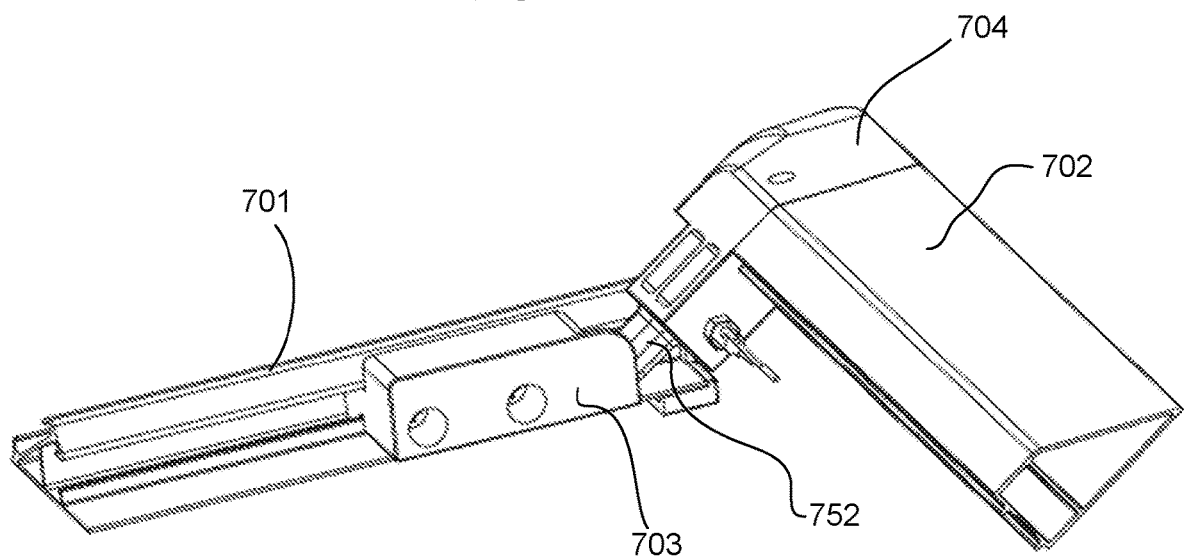

FIG. 7C shows a simplified diagram of the corner member 704 according to some embodiments of the present disclosure. The positioning tab 752 comprises a head portion 732 with a half cylinder shape and a shaft portion 734. FIG. 7D shows a simplified diagram of the connecting member 703 according to some embodiments of the present disclosure. FIG. 7E shows the cross section of the positioning groove 718. The positioning groove 718 comprises a top wall 741 (shown in FIG. 7E), a semicircular end wall 742 (shown in FIG. 7E) disposed distant from the third end 710 (shown in FIG. 7B) thereof; a ramp bottom wall 743; and a side wall 744 at the third end 710 of the connecting member 703. FIG. 7G shows the interaction between the positioning tab 752 and the positioning groove 718 when the end rail 702 is attached to the side rail 701. As shown in FIGS. 7D, 7E and 7G, the head portion (not shown) of the positioning tab 752 will slide over the ramp bottom wall 743 and is received by the semicircular end wall 742. The top wall 741 can stop the positioning tab 752 from escaping from the positioning groove 718 in the upward direction. The side wall 744 (shown in FIG. 7D) can stop the positioning tab 752 from escaping from the positioning groove 718 in the lateral direction.

While the above is a full description of the specific embodiments, various modifications, alternative constructions and equivalents may be used. Therefore, the above description and illustrations should not be taken as limiting the scope of the present disclosure which is defined by the appended claims.

What is claimed is:

1. A fastening system for use in a flexible tonneau cover system, comprising:
   a side rail having a latching groove at a side thereof;
   an end rail having a first end;

a corner member having a first end and a second end, wherein the corner member is connected at the first end thereof to the first end of the end rail;

a connecting member having a third end and a protrusion at a side, wherein the connecting member is connected at the third end thereof to the second end of the corner member, and the protrusion of the connecting member is received in the latching groove of the side rail;

wherein the corner member comprises a positioning tab at the second end thereof, and the connecting member comprises a positioning groove at the third end thereof, and the positioning tab is received in the positioning groove, wherein the positioning groove comprises:

a top wall;

a semicircular end wall disposed distant from the third end of the connecting member;

a ramp bottom wall; and a side wall at the third end of the connecting member.

2. The fastening system of claim 1, wherein the positioning tab comprises a head portion with a half cylinder shape and a shaft portion, wherein the head portion pushes against the semicircular end wall of the positioning groove in the connecting member.

3. The fastening system of claim 1, further comprises an end member, wherein the end member is connected to a first end of the side rail.

4. The fastening system of claim 3, wherein the end member comprise a connecting tab received in the latching groove at the first end of the side rail.

5. The fastening system of claim 3, wherein the end member further comprises a reinforce tab received in an corresponding opening formed at the first end of the side rail.

6. The fastening system of claim 1, further comprises a fastener inserted into a hole formed on the connecting member to fasten the connecting member into the latching groove in the side rail.

7. The fastening system of claim 1, wherein the corner member comprises a connecting tab received in an opening in the end rail.

8. The fastening system of claim 7, wherein the corner member comprises a fastener inserted into a hole formed on the connecting tab of the corner member to fasten the corner member into the opening on the end rail.

9. The fastening system of claim 7, wherein the corner member comprises a reinforce tab at the first end thereof, wherein the reinforce tab is received in an corresponding receiving opening formed at the first end of the end rail.

10. The fastening system of claim 1, further comprises a locking mechanism releasably locking the corner member and the side rail, wherein the locking mechanism comprises a locking member passing through a hole formed at the second end of the corner member;

an elastic member sleeved on the locking member;

a stop member coupled with the locking member to stop movement of the locking member in a direction; and an actuator coupled with the locking member to release a locking relationship between the corner member and the side rail.

11. A fastening system for use in a flexible tonneau cover system, comprising:

a side rail;

a corner member connected at a first end thereof to a second end of the side rail, wherein the corner member comprises a connecting tab on the first end thereof, and the side rail comprises an opening in the second end thereof, wherein the connecting tab is inserted in the opening to make the first end of the corner member positioned to adjoin the second end of the side rail, a substantially flat elongated slat having a first end along a longitudinal direction, wherein the elongated slat being inserted in a channel formed on a top portion of the side rail;

a fastening element coupled with a top surface of the elongated slat, the fastening element being disengageably coupled to the flexible tonneau cover system;

wherein the corner member further comprises a recess portion adjoining the first end thereof, wherein an accommodating groove is formed when the first end of the corner member adjoins the second end of the side rail.

12. The fastening system of claim 11 wherein the accommodating groove has a width of at least twice of a thickness of the flexible cover.

13. The fastening system of claim 11 wherein the accommodating groove has a depth that does not totally expose the elongated slat from the second end of the side rail when the elongated slat is inserted in the channel of the side rail.

14. A fastening system for use in a flexible tonneau cover system, comprising:

a side rail;

a substantially flat elongated slat having a first end along a longitudinal direction, wherein the elongated slat being inserted in a channel formed on a top portion of the side rail;

a fastening element coupled with a top surface of the elongated slat, the fastening element being disengageably coupled to the flexible tonneau cover system;

a reinforce tab coupled with the fastening element, wherein the reinforce tab wraps over the first end of the elongate slat and extends along a bottom surface of the elongated slat.

15. The fastening system of claim 14, wherein the fastening element is coupled with the top surface of the elongated slat through stitches extending along at least part of a length of the fastening element.

16. The fastening system of claim 15, wherein the channel of the side rail comprises a retaining member for retaining the elongated slat, wherein the retaining member covers at lease a part of the stitches.

17. The fastening system of claim 14, wherein the fastening system further comprises a sleeve wrapped over the elongated slat around a longitudinal axis of the elongated slat, wherein the fastening element is coupled with the sleeve.

18. The fastening system of claim 17, wherein the reinforce tab is coupled with the sleeve.

19. The fastening system of claim 14, wherein the fastening element comprises hook and loop fastener.

\* \* \* \* \*